US011698635B2

(12) United States Patent
Mizutani

(10) Patent No.: US 11,698,635 B2
(45) Date of Patent: Jul. 11, 2023

(54) CONTROL OF AN AUTONOMOUS VEHICLE

(71) Applicant: JAGUAR LAND ROVER LIMITED, Coventry (GB)

(72) Inventor: Tom Mizutani, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 478 days.

(21) Appl. No.: 16/321,979

(22) PCT Filed: Aug. 4, 2017

(86) PCT No.: PCT/EP2017/069794
§ 371 (c)(1),
(2) Date: Jan. 30, 2019

(87) PCT Pub. No.: WO2018/029101
PCT Pub. Date: Feb. 15, 2018

(65) Prior Publication Data
US 2019/0179309 A1 Jun. 13, 2019

(30) Foreign Application Priority Data
Aug. 10, 2016 (GB) ..................................... 1613723

(51) Int. Cl.
*G05D 1/00* (2006.01)
*B60W 50/14* (2020.01)
(Continued)

(52) U.S. Cl.
CPC ........... *G05D 1/0061* (2013.01); *B60K 28/02* (2013.01); *B60K 28/06* (2013.01); *B60W 50/14* (2013.01);
(Continued)

(58) Field of Classification Search
CPC .. G05D 1/0011; G05D 1/0022; G05D 1/0027; G05D 1/0061; G05D 1/0016;
(Continued)

(56) References Cited

U.S. PATENT DOCUMENTS 9,381,916 B1   7/2016 Zhu et al.
9,463,799 B1 * 10/2016 Bartels ................. G05D 1/0061
(Continued)

FOREIGN PATENT DOCUMENTS

DE   102013225759    6/2014
DE   102014210147    12/2015
(Continued)

OTHER PUBLICATIONS

International Search Report and Written Opinion, PCT/EP2017069794, dated Nov. 3, 2017.
(Continued)

*Primary Examiner* — Maceeh Anwari
(74) *Attorney, Agent, or Firm* — McCoy Russell LLP

(57) ABSTRACT

A method of controlling a primary vehicle (18) comprising an automated driving system (20) for driving the primary vehicle autonomously when the primary vehicle is in an autonomous mode, the primary vehicle also being operable manually by a driver when in a manual mode, the method comprising: determining failure of the driver to accept a request to switch the primary vehicle to the manual mode when the vehicle is in the autonomous mode; determining a primary vehicle driving state; acquiring vehicle data for one or more surrounding secondary vehicles (22); determining a contingency action to take with the primary vehicle based on the primary vehicle driving state and the vehicle data for the or each secondary vehicle; and outputting the contingency action to at least one system of the primary vehicle to drive
(Continued)

the primary vehicle autonomously in accordance with the determined contingency action.

14 Claims, 3 Drawing Sheets

(51) Int. Cl.
*B60K 28/02* (2006.01)
*B60K 28/06* (2006.01)
*G05D 1/02* (2020.01)
*B60W 50/00* (2006.01)

(52) U.S. Cl.
CPC ........... *G05D 1/0011* (2013.01); *G05D 1/021* (2013.01); *B60W 2050/0075* (2013.01); *B60W 2556/45* (2020.02); *B60W 2556/65* (2020.02); *G05D 2201/0213* (2013.01)

(58) Field of Classification Search
CPC ...... G05D 1/0055; G05D 1/021; B60K 28/02; B60K 28/06; B60K 28/066; B60W 40/08; B60W 50/14; B60W 50/16; B60W 2050/143; B60W 2050/146; B60W 2050/007; B60W 2050/0071; B60W 2050/0072; B60W 2050/0077; B60W 2556/45; B60W 2556/50; B60W 2556/65; B60W 60/007; G08G 1/096725
USPC .......................................................... 701/24
See application file for complete search history.

(56) References Cited

U.S. PATENT DOCUMENTS

| | | | |
|---|---|---|---|
| 9,523,984 B1 * | 12/2016 | Herbach | B60W 10/20 |
| 2011/0241862 A1 | 10/2011 | Debouk et al. | |
| 2012/0221168 A1 | 8/2012 | Zeng et al. | |
| 2014/0300479 A1 | 10/2014 | Wolter et al. | |
| 2015/0127189 A1 | 5/2015 | Mehr | |
| 2015/0153733 A1 | 6/2015 | Ohmura et al. | |
| 2016/0107655 A1 | 4/2016 | Desnoyer | |
| 2016/0167653 A1 | 6/2016 | Malone et al. | |
| 2017/0045885 A1 * | 2/2017 | Okumura | G05D 1/0022 |
| 2017/0072967 A1 * | 3/2017 | Fendt | B60W 10/18 |
| 2017/0131719 A1 * | 5/2017 | Micks | G06V 20/56 |
| 2018/0208211 A1 * | 7/2018 | Chiba | B60W 50/082 |
| 2018/0253977 A1 * | 9/2018 | Oshida | B60W 30/165 |
| 2019/0286143 A1 * | 9/2019 | Ross | G05D 1/0027 |

FOREIGN PATENT DOCUMENTS

| | | | |
|---|---|---|---|
| EP | 2314490 | 4/2011 | |
| WO | 2015180931 | 12/2015 | |
| WO | 2017142931 | 8/2017 | |
| WO | WO-2017142931 A1 * | 8/2017 | ............ B60W 10/04 |

OTHER PUBLICATIONS

Search and Examination Report, GB17125303, dated Jan. 10, 2018.
Search and Examination Report, GB1613723.4, dated Jan. 18, 2017.

* cited by examiner

CONTROL OF AN AUTONOMOUS VEHICLE

CROSS-REFERENCE TO RELATED APPLICATIONS

This application is a 371 of International Application No. PCT/EP2017/069794, filed Aug. 4, 2017, which claims priority to GB Patent Application 1613723.4, filed Aug. 10, 2016, the contents of both of which are incorporated by reference herein in their entirety.

TECHNICAL FIELD

The present disclosure relates to control of an autonomous vehicle. In particular, but not exclusively, the disclosure relates to control of a BASt level 3 autonomous vehicle. Aspects of the invention relate to a method, to a vehicle controller, to a remote controller and to a vehicle.

BACKGROUND

The degree to which operation of a vehicle is automated has been classified into six discrete levels by the Germany Federal Highway Research Institute (BASt). These BASt levels range from level zero, for vehicles having no significant autonomy, to level 5, which designates vehicles that are fully autonomous and in which no driver input is required.

BASt level 3 autonomous vehicles are defined as vehicles in which an automated driving system can handle all aspects of driving, but with the expectation that a human driver will respond appropriately to a request to intervene in certain driving scenarios.

There are various reasons why the automated driving system may need to hand back control to the driver. For example, vehicle sensors upon which the automated driving system relies may be impaired by weather conditions, by dirt or by a fault, therefore compromising the ability of the driving system to sense its surroundings. Alternatively, the vehicle may enter a complex driving situation that the automated driving system is not capable of handling and so hand back of control to the driver is planned, for example leaving or joining a motorway.

When a request to hand back control is issued, the driver should indicate their consent to assume control, at which point the automated driving system relinquishes control to the driver. However, although a driver is expected to remain alert to requests from the automated driving system for handing back control, there will inevitably be occasions when such requests are not responded to, for example if the driver has fallen asleep or is unwell. The automated driving system must be equipped with contingency plans to cope with such situations, to enable it to determine and implement the most appropriate action with the vehicle.

In many situations the safest action to take may be simply to bring the vehicle to a gradual halt at the side of a road. This course of action will often be appropriate for quiet roads, for example. However, stopping the vehicle may be dangerous in other situations, such as when travelling on a motorway. Accordingly, the contingency plan adopted by the automated driving system must be responsive to the present driving situation.

Of course, if the reason for handing back control is that the ability of the automated driving system to sense its environment is impaired, deciding the appropriate action to take in the event of a failure of the driver to accept control is particularly challenging.

It is against this background that the present invention has been devised.

SUMMARY OF THE INVENTION

Aspects and embodiments of the invention provide a method of controlling a vehicle, a vehicle controller, a remote controller for remotely driving a vehicle, and a vehicle as claimed in the appended claims.

According to another aspect of the invention, there is provided a method of controlling a primary vehicle comprising an automated driving system for driving the primary vehicle autonomously when the primary vehicle is in an autonomous mode, the primary vehicle also being operable manually by a driver when in a manual mode. The method comprises determining failure of the driver to accept a request to switch the primary vehicle to the manual mode when the vehicle is in the autonomous mode, and determining a primary vehicle driving state. The method further comprises acquiring vehicle data from one or more surrounding secondary vehicles, and determining a contingency action to take with the primary vehicle based on the primary vehicle driving state and the vehicle data from the or each secondary vehicle. The method also comprises outputting the contingency action to at least one system of the primary vehicle to drive the primary vehicle autonomously in accordance with the determined contingency action.

By acquiring vehicle data from secondary vehicles that surround the primary vehicle, an appropriate course of action can be determined for the primary vehicle that takes into account the states of the primary vehicle and each secondary vehicle, where the state of a vehicle is an indication of driving parameters including, for example, the present speed and direction of the vehicle. This enables control of the primary vehicle in a manner that is responsive to its present driving situation in the event that a request to switch to the manual mode is not accepted by the driver, thereby providing a means of handling failure of the driver to assume control of the vehicle when required.

The method could be implemented by the automated driving system of the primary vehicle, for example, in which case outputting the contingency action entails controlling vehicle systems such as steering and braking in accordance with the contingency action. Alternatively, the method could be performed by a remote controller, which may output the contingency action as control commands to the primary vehicle.

The method may comprise acquiring vehicle data by communicating directly with one or more of the one or more secondary vehicles, which minimises latency associated with acquiring the data. Alternatively, or in addition, vehicle data may be acquired by communicating with a remote controller, which may offer the ability to acquire data for secondary vehicles that are out of range for direct communications, and also to coordinate actions between all vehicles.

The method may comprise acquiring vehicle data by communicating directly with the or each secondary vehicle that is in close proximity to the primary vehicle to obtain vehicle data for those secondary vehicles, and communicating with a remote controller to obtain vehicle data for the or each secondary vehicle that is not in close proximity to the primary vehicle. This arrangement minimises latency by using direct communications where possible, whilst also maximising the number of secondary vehicles that are taken into account in the action implemented by the primary vehicle.

The method may comprise obtaining data from an onboard sensor of the primary vehicle to supplement the vehicle data for the or each secondary vehicle.

In some embodiments, the vehicle data for the or each secondary vehicle includes at least one of the following: velocity; acceleration; indicator state; braking state; planned actions; location; driving mode; terrain type; and, for secondary vehicles with capable sensors, the relative locations of any detected tertiary vehicles that may be in the vicinity of the secondary vehicle and/or causing an alert to the secondary vehicle.

The method may comprise issuing the request to switch to the manual mode through a driver information system of the primary vehicle, The method may comprise determining failure of the driver to accept the request to switch the primary vehicle to the manual mode within a predetermined time period.

Where the request to switch to the manual mode is issued through a driver information system of the primary vehicle, the method may comprise determining failure of the driver to accept the request to switch the primary vehicle to the manual mode from a lack of driver input to the driver information system within a predetermined time period. Alternatively, the method may comprise determining failure of the driver to accept the request to switch the primary vehicle to the manual mode from a rejection of the request by the driver through the driver information system.

The method may comprise determining failure of the driver to accept the request to switch the primary vehicle to the manual mode from a lack of driver input to one or more vehicle systems within a predetermined time period. Such vehicle systems may comprise a steering system, a braking system or both.

The method may comprise acquiring the vehicle data from the or each secondary vehicle at the primary vehicle. Alternatively, the method may comprise transmitting the primary vehicle driving state and a signal from the primary vehicle to a remote controller, the signal indicating failure of the driver to accept the request to switch the primary vehicle to the manual mode, acquiring the vehicle data for the or each secondary vehicle at the remote controller, determining, at the remote controller, the contingency action to take with the primary vehicle based on the primary vehicle driving state and the vehicle data for the or each secondary vehicle, and outputting the contingency action from the remote controller to the automated driving system of the primary vehicle.

Another aspect of the invention provides a vehicle controller for driving a primary vehicle autonomously when the primary vehicle is in an autonomous mode, the primary vehicle also being operable manually by a driver when in a manual mode. The vehicle controller comprises an output configured to issue, when the primary vehicle is in the autonomous mode, a request to switch the primary vehicle to the manual mode, and an input arranged to receive vehicle data from one or more surrounding secondary vehicles. The controller further comprises an electronic processor configured to determine: failure of the driver to accept the request to switch the primary vehicle to the manual mode; a primary vehicle driving state; and a contingency action to take with the primary vehicle based on the primary vehicle driving state and the vehicle data for from one or more surrounding secondary vehicles received at the input. The controller also includes a control module configured to issue control commands to drive the primary vehicle autonomously in accordance with the determined contingency action.

The electronic processor may have one or more electrical inputs for receiving one or more signals indicative of the data received by the input of the controller. The controller may comprise an electronic memory device electrically coupled to the electronic processor and having instructions stored therein, the processor being configured to access the memory device and to execute the instructions stored therein such that it is operable to detect failure of the driver to accept the request to switch the primary vehicle to the manual mode and to determine the contingency action to take.

The method may comprise acquiring the vehicle data by communicating directly with one or more of the one or more secondary vehicles.

The method may comprise acquiring the vehicle data by communicating with a remote controller.

According to another aspect of the invention, there is provided a vehicle controller for driving a primary vehicle autonomously when the primary vehicle is in an autonomous mode, the primary vehicle also being operable manually by a driver when in a manual mode, the vehicle controller comprising an output configured to issue, when the primary vehicle is in the autonomous mode, a request to switch the primary vehicle to the manual mode, an input arranged to receive data, a processor configured to determine failure of the driver to accept the request to switch the primary vehicle to the manual mode, to determine a primary vehicle driving state, and to transmit the primary vehicle driving state and a signal from the primary vehicle to a remote controller, the signal indicating failure of the driver to accept the request to switch the primary vehicle to the manual mode, the data received by the input comprising a contingency action determined by the remote server, and a control module configured to issue control commands to drive the primary vehicle autonomously in accordance with the contingency action.

The data received by the input may comprise control commands issued by a remote server, and the processor may be configured to determine a contingency action based on the control commands.

According to another aspect of the invention, there is provided a vehicle comprising the controller of the above aspect.

A further aspect of the invention provides a remote controller for remotely communicating with a primary vehicle when the primary vehicle is in an autonomous mode, the primary vehicle also being operable manually by a driver when in a manual mode, the remote controller comprising an input arranged to receive data from the primary vehicle and from one or more secondary vehicles surrounding the primary vehicle, the data comprising a signal indicating failure of the driver to accept the request to switch the primary vehicle to the manual mode, and vehicle data from the or each secondary vehicle; and an output configured to transmit the vehicle data from the or each secondary vehicle to the primary vehicle to enable the primary vehicle to determine a contingency action.

A further aspect of the invention provides a remote controller for remotely driving a primary vehicle autonomously when the primary vehicle is in an autonomous mode, the primary vehicle also being operable manually by a driver when in a manual mode. The remote controller comprises an input arranged to receive data from the primary vehicle and from one or more secondary vehicles surrounding the primary vehicle, the data comprising a primary vehicle driving state, a signal indicating failure of the driver to accept the request to switch the primary vehicle to the manual mode, and vehicle data for the or each secondary vehicle; a processor configured to determine a contingency action to take with the primary vehicle based on the primary vehicle driving state and the data received at the input; and an output configured to issue control commands to the primary vehicle to drive the primary vehicle autonomously in accordance with the determined contingency action.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
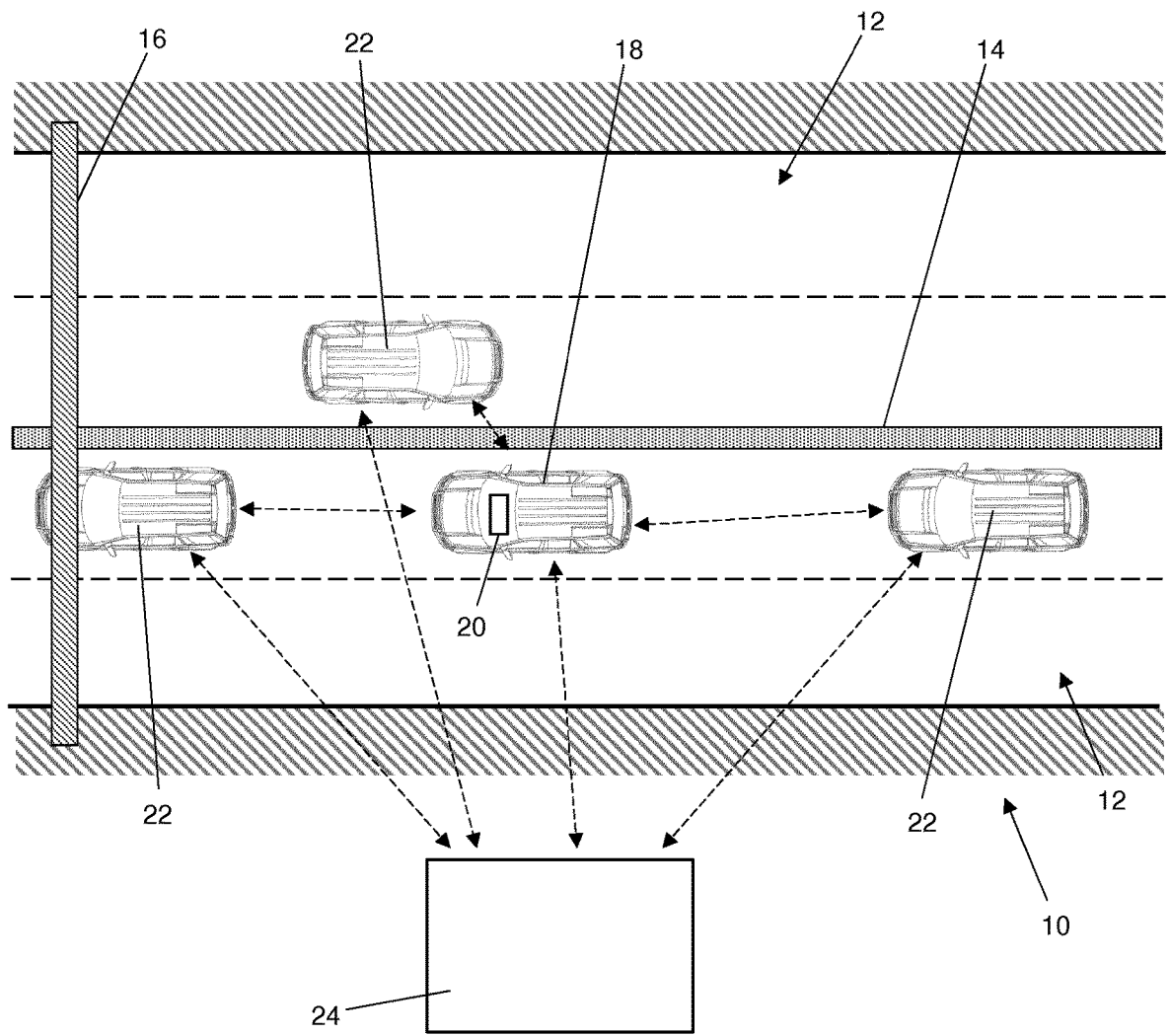
FIG. 1 is a plan view of a section of road containing a primary autonomous vehicle surrounded by secondary vehicles.

FIG. 1 shows a typical driving situation on a section of dual-carriageway motorway 10 as an example of a scenario in which methods according to embodiments of the invention may be applied. It should be appreciated, however, that the present invention is not limited to motorway driving, and may find application in all kinds of driving scenarios.

In the example shown in FIG. 1, the section of motorway 10 includes a pair of two-lane carriageways 12 that are separated by a central reservation 14. Three vehicles occupy the carriageway 12 shown lowermost in FIG. 1, and a fourth vehicle travels in the opposite direction on the uppermost carriageway 12. FIG. 1 also shows a smart gantry 16 spanning the motorway 10.

The vehicle of interest, hereafter referred to as the primary vehicle 18, is the middle vehicle of the three travelling on the lower carriageway 12. The primary vehicle 18 is a BASt level 3 autonomous vehicle having an automated driving system 20, whereas the other vehicles, hereafter referred to as secondary vehicles 22, may fit into any BASt level and so may be fully manual, fully autonomous, or anything in between.

As the primary vehicle 18 is BASt level 3, the automated driving system 20 requires input from a human driver in certain circumstances. Therefore, the primary vehicle 18 can be considered to be operable in two driving modes, namely: an autonomous mode, in which the automated driving system 20 has control of the vehicle; and a manual mode, in which the human driver has control and drives the primary vehicle 18 manually.

When operating in the autonomous mode, the automated driving system 20 controls various vehicle systems, such as braking, acceleration and steering systems, based on an assessment of the surroundings, to drive the primary vehicle 18 safely, for example by issuing control commands to the vehicle systems. The assessment of the surroundings is determined based on data obtained from on-board sensors, which may include LIDAR or LADAR sensors, or a vehicle-mounted camera, for example. The assessment of the surroundings takes into account the course of the road ahead and the relative positions and velocities of the secondary vehicles 22.

Should one of the sensors upon which the automated driving system relies fail, the resulting diminished data subsequently available to the automated driving system 20 may be insufficient to provide a full assessment of the primary vehicle's surroundings. In such situations, the automated driving system is configured to issue a request to the driver to switch the primary vehicle 18 to the manual operating mode so that the driver assumes control and drives the vehicle in the ordinary manner. The request may be issued through a driver information system such as an instrument cluster or a vehicle infotainment system, for example, or using a dedicated visual or audible alarm.

It is noted that there are other reasons why such a request may be generated. For example, as mentioned previously there may be specific driving situations that the automated driving system is not designed to handle, and for which it is therefore planned for the automated system to hand control back to the driver. Such situations may include leaving or joining a motorway, for example.

Accepting a request to switch to the manual mode may entail interacting with the driver information system or actuating a switch within the vehicle, for example. Alternatively, the request may be accepted by the driver providing an input to a vehicle system, for example by turning a steering wheel or pressing a brake pedal.

As already noted, there may be occasions when the driver fails to accept a request to switch to the manual mode by taking one of the above actions. The automated driving system 20 cannot wait indefinitely for the driver to respond, noting that requests are typically raised when the primary vehicle 18 enters a situation that the automated driving system 20 is not capable of handling. Therefore, after a predetermined period has elapsed since issuing the request, the automated driving system 20 must decide that the driver has failed to assume control and that therefore a contingency measure must be implemented.

The predetermined period may be variable depending on the specific circumstances. For example, a more urgent need to take action arises where a sensor fails during high-speed driving on a motorway, for example, than in a planned hand back of control. Typically, the predetermined period may vary between three to ten seconds.

To be able to determine an appropriate course of action for the primary vehicle 18, it is important to determine the driving state of the primary vehicle 18 and obtain information regarding the states of the secondary vehicles 22, so that collisions or otherwise unsafe scenarios can be avoided. In embodiments of the invention, the contingency measures that are implemented in the event that a driver fails to accept a request to switch to the manual mode involve obtaining data relating to a state of each secondary vehicle 22. That data can then be used in combination with the primary vehicle 18 driving state to determine the safest way to manage the primary vehicle 18.

The data relating to the secondary vehicles 22 may be obtained directly from those vehicles using vehicle-to-vehicle communication. For example, current 802.11p DSRC technology enables such communication between vehicles in close proximity. FIG. 1 represents communications of this type using dashed arrows between the primary vehicle 18 and each of the secondary vehicles 22. The skilled reader will be familiar with vehicle-to-vehicle communication and the equipment required for such communications, which are therefore not described in detail here to avoid obscuring the inventive concept.

Alternatively, or in addition, the data can be obtained from a remote server or remote controller 24, which is represented in FIG. 1 at the roadside but in practice could be located almost anywhere. In such arrangements, each secondary vehicle 22 transmits data relating to its driving state to the remote server 24, which forwards the data on to the primary vehicle 18. Such communications are referred to as vehicle-to-cloud communications, and are represented in FIG. 1 by dashed arrows between the remote server 24 and each of the vehicles 18, 22. Vehicle-to-cloud communications may be transmitted to the remote server 24 using a cellular network, typically through local cell towers (not shown).

Presently, vehicle-to-cloud communications are known for some non-critical applications for which the relatively poor latency associated with current technology for such communications is acceptable. However, it is expected that forthcoming 5G networks will provide improved reliability and latency compared with 4G networks, thus rendering vehicle-to-cloud communications viable for the purposes of the present invention.

A key enabler of reduced latency in vehicle-to-cloud communications will be 'edge computing', where data is processed closer to the end-user, which in the context of the present invention is the primary vehicle 18. This approach is referred to as 'mobile edge computing' when applied to cellular networks, and replaces a conventional approach in which data is sent from a cell tower to the core of a network for processing. The conventional approach involves high network congestion and several individual transmissions of each parcel of data across multiple wired and wireless links. Localised processing of data therefore reduces latency by eliminating many of the stages involved in the conventional approach.

In the context of gathering data from surrounding secondary vehicles 22, it is likely that all the secondary vehicles 22 in the vicinity of the primary vehicle 18, even those beyond the range of vehicle-to-vehicle communications, will be connected to just a few cell towers. Therefore, if the vehicle-to-cloud infrastructure is configured in such a way that cell towers in a similar geographic location can communicate locally rather than through a central data centre, latencies can be reduced. To facilitate this, aspects of the remote server functionality could be located at the network edge.

Vehicle-to-vehicle communications may be used due to the lower latency that is achievable using presently available technology. However, once forthcoming 5G networks are established, it is expected that the latency of vehicle-to-cloud communications will be reduced by one or two orders of magnitude compared to today's 4G LTE networks, at which point vehicle-to-cloud communication may be used due to the ability that it provides to extend situational awareness for the primary vehicle 18 beyond the limit of vehicle-to-vehicle communications, and to coordinate movements of all vehicles 18, 22. Nonetheless, vehicle-to-vehicle communications may be retained as a fail-safe for situations in which vehicle-to-cloud communications are impaired, such as when driving out of range of a cell tower, for example.

Vehicle-to-vehicle communication typically has a limited range and so may only be suitable for use with secondary vehicles 22 in close proximity to the primary vehicle 18. However, the vehicles that need to be taken into account to determine an appropriate course of action for the primary vehicle 18 after a failed hand back of control may include vehicles lying outside the range of vehicle-to-vehicle communication, especially in high-speed driving on a motorway, for example. Therefore, to ensure that the primary vehicle 18 obtains data from as many secondary vehicles 22 as necessary, one approach may be to obtain data for nearby secondary vehicles 22 using low-latency vehicle-to-vehicle communication, and in parallel obtain data for secondary vehicles 22 set at a greater distance from the primary vehicle 18 using vehicle-to-cloud communication. Using a mixture of the two communications techniques also increases redundancy within the system, thereby increasing the ability of the system to respond to problems or faults with either type of communication.

Conversely, at other times the remote server 24 may be out of range, for example if the primary vehicle 18 is driving off road, in which case the primary vehicle 18 must rely on vehicle-to-vehicle communication with surrounding secondary vehicles 22, optionally supported by data captured by on-board sensors of the primary vehicle 18 where possible.

The data from the secondary vehicles 22 can be obtained using a blend of vehicle-to-vehicle and vehicle-to-cloud communication that is appropriate to the specific situation and the capabilities of available technology.

Obtaining the required data may be complicated if a secondary vehicle 22 lacks the requisite communications equipment to be able to transmit data relating to its driving state to either the primary vehicle 18 or to the remote server 24. To address this, it is envisaged that secondary vehicles 22 that are able to communicate may obtain data relating to nearby vehicles using on-board sensors. The secondary vehicles 22 can then transmit data relating both to themselves and to their neighbouring vehicles to the primary vehicle 18 or to the remote server 24.

The vehicle data to be obtained from the secondary vehicles 22 comprises data generated by or received from one or more sensor or control systems of the secondary vehicle, and can include one or more of the following: velocity, acceleration, indicator states, braking states, location, driving mode, terrain type, and for vehicles 22 with capable sensors, the relative locations of any detected tertiary vehicles that may be in the vicinity of the secondary vehicle 22 and/or causing an alert to the secondary vehicle 22, such as a blind spot alert to warn a driver of the secondary vehicle 22 not to change lanes. Together, these parameters define a driving state for each secondary vehicle 22 that can be used by the primary vehicle 18 to complete an assessment of its surroundings. For fully autonomous secondary vehicles 22, the data may further indicate planned actions for the vehicle 22 in addition to the instantaneous driving state, thereby enhancing the ability of the primary vehicle 18 to determine an appropriate course of action by taking into account future actions of other vehicles.

It is noted that the primary vehicle 18 determines its own driving state using corresponding data to that obtained from the secondary vehicles 22.

Figure 2:
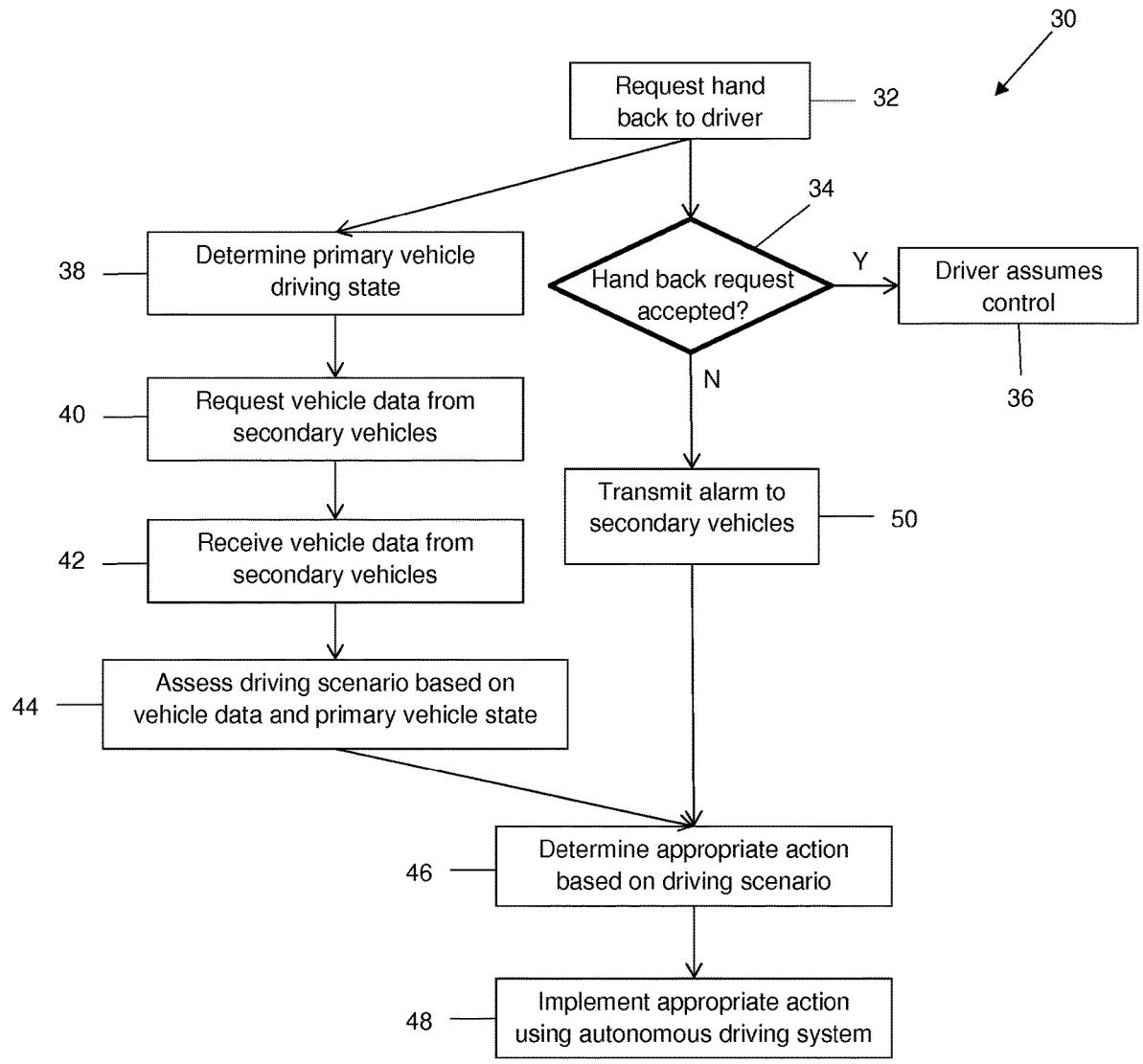
FIG. 2 is a flow diagram representing a method according to an embodiment of the invention for controlling the primary vehicle of FIG. 1.

FIG. 2 is a flow diagram showing a process 30 according to one embodiment of the invention for handling a failed hand back of control to a driver in a BASt level 3 autonomous primary vehicle 18.

The process starts when the automated driving system 20 of the primary vehicle 18 delivers at step 32, by any of the means listed above, a request to the driver to hand back control of the primary vehicle 18 by switching to the manual mode. If the request is accepted at step 34 within the relevant predetermined time period, the primary vehicle 18 is put into the manual mode and the driver assumes control at step 36.

In parallel with delivering the request to switch to the manual mode, the primary vehicle 18 determines at step 38 its driving state and transmits at step 40 a request for vehicle data from all secondary vehicles 22 in the vicinity. The request may be transmitted using vehicle-to-vehicle communication, vehicle-to-cloud communication, or a combination of the two. On receiving the request, each secondary vehicle 22 transmits vehicle data relating to its respective driving state, which is received at step 42 by the primary vehicle 18. As for the initial request, the vehicle data can be transmitted using vehicle-to-vehicle communication, vehicle-to-cloud communication, or a combination of the two.

In an alternative embodiment, each secondary vehicle 22 may broadcast its respective vehicle data continuously or at regular intervals, obviating the need for the request for such data from the primary vehicle 18. In such arrangements, the primary vehicle 18 simply gathers the data broadcast by the secondary vehicles 22 without sending a request for such data.

Once the primary vehicle 18 has acquired the vehicle data from the secondary vehicles 22, it processes the data using an on-board processor associated with the automated driving system 20 to make an assessment at step 44 of its driving scenario, namely the respective states of each vehicle 22 surrounding the primary vehicle 18 alongside the driving state of the primary vehicle 18 itself. It is noted that a driving state is generally indicative of the position and velocity of a vehicle, and may further include indications of future actions.

The assessment of the driving scenario takes place while the automated driving system 20 awaits a response from the driver following the request to switch to the manual mode. Since the automated driving system 20 waits for a period of, for example, five seconds for driver input, performing these actions in parallel optimises the response of the autonomous vehicle to a failed hand back of control. Accordingly, if the request is not accepted in time, the automated driving system 20 then determines at step 46 the most appropriate action for the primary vehicle 18 based on the assessment of the driving scenario. Once determined, the appropriate action is then implemented at step 48 by the automated driving system 20.

As shown in FIG. 2, before determining the action for the primary vehicle 18 to take, an alarm may be transmitted at step 50 to the secondary vehicles 22 to alert them to the fact that there has been a failed hand back of control in the primary vehicle 18, which may enable the secondary vehicles 22 to take evasive or precautionary action such as increasing their respective distances from the primary vehicle 18.

By way of example, the positions and velocities of the secondary vehicles 22 may preclude rapid deceleration, since the secondary vehicles 22 may not be able to react in time, in which case the most appropriate action may be to slow gently. In another example, the request to switch to the manual mode may be generated in anticipation of exiting a motorway, in which case the most appropriate action for the primary vehicle 18 may be to remain on the motorway if the request is not accepted, provided that it is safe to do so with respect to the states of nearby secondary vehicles 22. Further examples are described later.

In the above embodiment, the primary vehicle 18 has access to all of the vehicle data relating to the secondary vehicles 22, and so the decision steps involved in determining an appropriate course of action for the primary vehicle 18 are implemented locally by a processor residing in the primary vehicle 18. Specifically, in this embodiment the processor forms part of the automated driving system 20, which is adapted compared with known systems to include: an output for issuing requests to switch to the manual mode, requests for vehicle data and alerts for secondary vehicles 22; an input to receive vehicle data from secondary vehicles 22; a processor arranged to determine the driving scenario and the appropriate contingency action for the primary vehicle 18 to take; and a control module configured to issue control commands to vehicle systems to implement the determined appropriate action.

However, in an alternative embodiment, instead of transmitting all data to the primary vehicle 18, the vehicle data could instead be collected by the remote server 24 to be processed centrally. It is possible that eventually a vehicle-to-cloud communication based approach with centralised processing will be used by default once the technology matures, to take advantage of the enhanced ability to coordinate movements of all vehicles 18, 22 on a section of road with such an approach. In such embodiments, the remote server 24 acts as a remote controller to determine contingency actions for the primary vehicle 18 and to transmit control commands to the primary vehicle 18 to implement the contingency actions.

Figure 3:
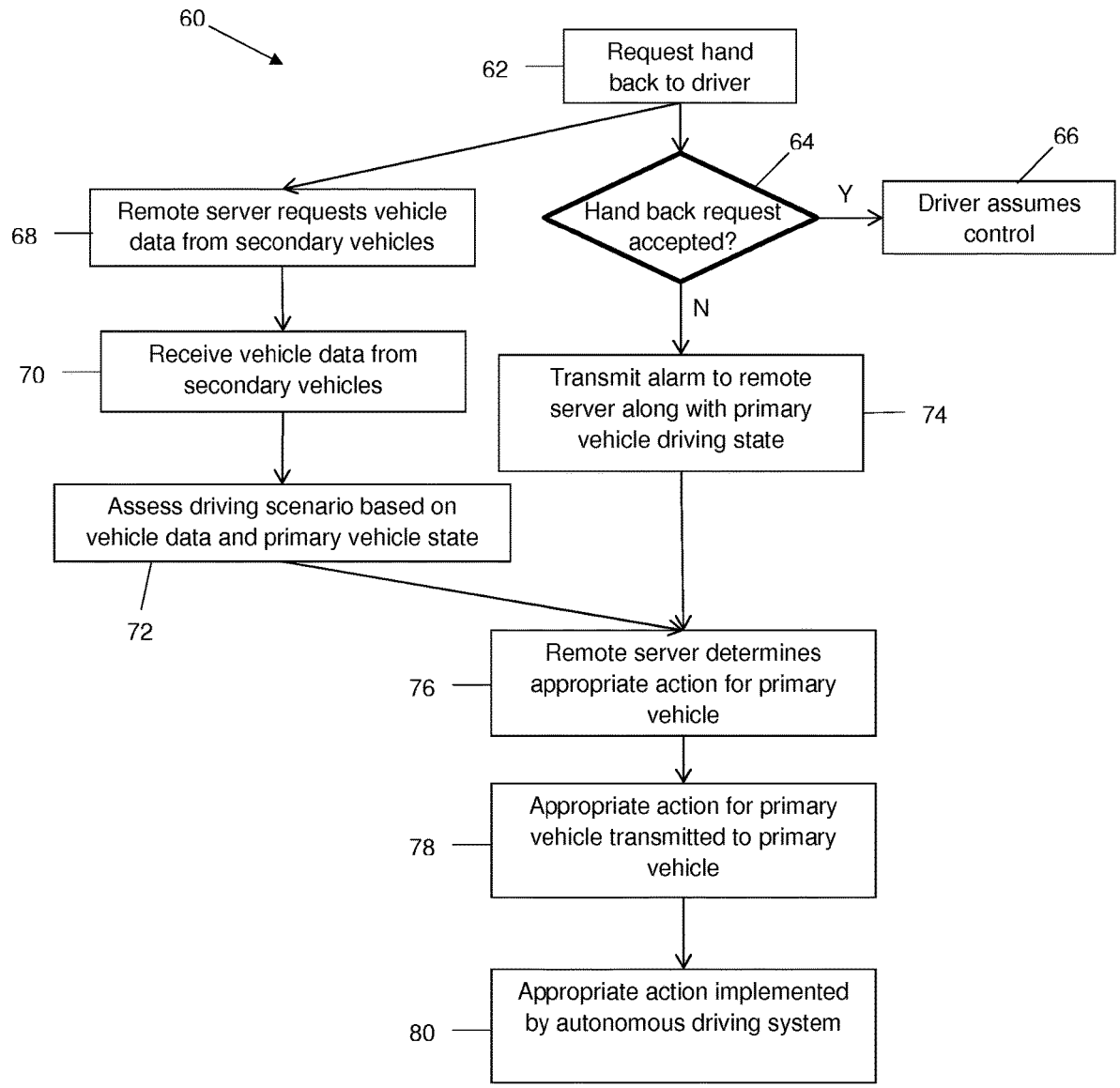
FIG. 3 is a flow diagram representing a method according to another embodiment of the invention for controlling the primary vehicle of FIG. 1.

FIG. 3 represents a process 60 for determining the most appropriate action for a primary vehicle 18 in such an arrangement. The process 60 begins in the same way as in the embodiment of FIG. 2, namely by delivering at step 62 a request to hand control back to the driver from the automated driving system 20. If the request is accepted at step 64, the driver assumes control at step 66.

In parallel, the remote server 24 determines the driving state of the primary vehicle 18 by requesting at step 68 vehicle data from each secondary vehicle 22 in close proximity to the primary vehicle 18. On receiving the request, the secondary vehicles 22 transmit their respective vehicle data, which is received at step 70 by the remote server 24. The remote server 24 then assesses at step 72 the driving scenario based on the vehicle data received from the primary vehicle 18 and the secondary vehicles 22.

If the request to switch to the manual mode is not accepted, an alarm indicating that there has been a failed hand back of control to the driver is transmitted at step 74 to the remote server 24. On receiving such an alarm, the remote server 24 determines at step 76 the most appropriate contingency action for the primary vehicle 18 based on its assessment of the driving scenario. The remote server 24 then transmits at step 78 the determined course of action to the primary vehicle 18, for it then to be implemented at step 80 by the automated driving system 20. The remote server 24 may transmit specific control commands corresponding to the contingency action to directly control the vehicle, or transmit the contingency action to the vehicle which then takes the necessary steps to implement the contingency action.

The skilled person will appreciate that the above described processes represent two of several possible ways of implementing the broad concept of managing a failure to hand control back to a driver by obtaining data from surrounding vehicles and acting accordingly.

The specific way in which control is implemented will depend on the nature of each of the secondary vehicles 22 in the affected area surrounding the primary vehicle 18. If the secondary vehicles 22 are autonomous, a coordinated approach is possible in which not only is the primary vehicle 18 controlled in an appropriate way, but also the secondary vehicles 22 are controlled to account for the handicapped primary vehicle 18, for example by manoeuvring to create more space around the primary vehicle 18.

Alternatively, if the secondary vehicles 22 are non-autonomous, the appropriate action for the primary vehicle 18 should take into account the likely reactions of the drivers of the secondary vehicles 22, and the lack of coordinated action that is possible with autonomous vehicles.

One measure that can be taken to aid non-autonomous secondary vehicles 22 is to provide warnings to the drivers of those vehicles 22 via the smart gantry 16 that a primary vehicle 18 is operating in a handicapped manner following a failed hand back of control to its driver.

Some further examples of specific contingency plans are outlined below to illustrate the implementation of the above processes and systems.

Starting with motorway driving, various traffic conditions may apply at the point of a failure to hand back control to a driver, and each condition entails a different response. In each case, the vehicle data required from the secondary vehicles 22 to implement an appropriate contingency action includes the velocity and acceleration of secondary vehicles 22 both ahead of and behind the primary vehicle 18.

If the traffic is stationary ahead, or becoming stationary, the request to switch to the manual mode is most likely generated as a result of a failure of on-board sensors of the primary vehicle 18. This failure may be due to standing water, fog, snow, poor light conditions, road markings or electromagnetic interference, to name a few examples. Actions such as reducing the speed of the primary vehicle 18 until autonomous driving becomes viable again, or changing lane to move the primary vehicle 18 into the hard shoulder before stopping are not appropriate or safe in stationary traffic. Therefore, a preferred contingency action for stationary traffic is to stop without changing lane.

If the traffic is dense, but not entirely stationary, similar considerations apply but the most favourable contingency action is likely to be to reduce the speed of the primary vehicle 18 until autonomous driving can be resumed. The position and speed data of secondary vehicles beside and behind the primary vehicle in adjacent lanes reveal when a lane change manoeuvre is not possible without disruption to traffic, taking into account the current speed and planned acceleration of the primary vehicle. More generally, the velocity, acceleration and braking data of secondary vehicles ahead of the primary vehicle allows the primary vehicle (or the remote server) to distinguish between the two cases above of stationary and dense traffic ahead, and between these two cases and free-flowing traffic, thereby determining whether slowing the primary vehicle, bringing it to a halt in the current lane, or changing lane is the more appropriate contingency action. The ability to share data from secondary vehicles through a vehicle-to-cloud system provides a benefit here, since queuing traffic even a short distance up the road may easily be beyond the sensor range of the primary vehicle to detect otherwise.

In flowing traffic, stopping in the driving lane becomes an unsafe option, and so reducing the speed of the primary vehicle 18 or moving the primary vehicle 18 to the hard shoulder before stopping the vehicle 18 are the preferred contingency options. Using data from secondary vehicles regarding their velocity, acceleration, position, and where available, planned actions, the primary vehicle or remote server is able to plot a route from the current driving lane to the hard shoulder based upon a prediction of free road space over the coming seconds, in order to minimise disruption to the paths of following secondary vehicles. Using data only from the primary vehicle's on-board sensors would not easily facilitate this for several reasons: 1) some data cannot be sensed (planned actions of other vehicles); 2) coverage areas of vehicle sensors such as radar and cameras tend to be biased to the front of the vehicle rather than behind; 3) some secondary vehicles will be out of view behind other vehicles, or otherwise out of sensor range.

When joining or leaving a motorway, a request to switch to the manual mode most likely arises because the automated driving system 20 is not intended to handle the driving scenario. For joining a motorway, continued driving should be avoided to minimise the risk of an accident by preventing the primary vehicle 18 from entering a situation where it is not designed to operate autonomously. So, the preferred contingency action for this scenario is to move the primary vehicle 18 to the hard shoulder. When leaving the motorway, stopping in the driving lane would often be dangerous and so the preferred contingency is to continue with steady-state operation of the primary vehicle 18 by staying on the motorway.

In urban or rural driving, the contingency options are largely independent of traffic conditions, and requests for handing control to the driver may result from sensor impairment as for motorway driving. A request for switching to the manual mode may also arise if the road is not navigable automatically, for example if there are roadworks, if the roadmap used by the automated driving system 20 is not accurate, or if there is an obstruction.

For urban or rural driving, unlike when exiting a motorway it is often not possible to bypass the required action safely, and so the preferred contingency is to stop in the driving lane. This is typically safe due to the lower driving speeds in these driving scenarios. For rural driving specifically, it may alternatively be easier to reduce the driving speed until autonomous driving can be resumed.

Another possibility in all scenarios is to obtain data from secondary vehicles 22 that would allow the automated driving system 20 to overcome the problem that triggered a request to switch to the manual mode. For example, if the problem was an inaccurate roadmap, it may be possible to obtain an accurate roadmap from a secondary vehicle 22 or from the remote server.

Many modifications may be made to the above examples without departing from the scope of the present invention as defined in the accompanying claims.

The invention claimed is:

1. A method of controlling a primary vehicle comprising an automated driving system for driving the primary vehicle autonomously when the primary vehicle is in an autonomous mode, the primary vehicle also being operable manually by a driver when in a manual mode, the method comprising:
   determining failure of the driver to accept a request to switch the primary vehicle to the manual mode when the primary vehicle is in the autonomous mode;
   determining a primary vehicle driving state, wherein the primary vehicle driving state comprises a position and a velocity of the primary vehicle;
   acquiring vehicle data from one or more surrounding secondary vehicles, wherein the vehicle data comprises parameters defining a driving state for each secondary vehicle indicative of at least one of an indicator state and planned actions;
   making an assessment of the driving state for each respective secondary vehicle;
   determining a contingency action to take with the primary vehicle based on the position and the velocity of the primary vehicle and the indicator state and/or planned actions of each secondary vehicle, wherein the determined contingency action is based on the indicator state and/or planned actions of at least one of the one or more surrounding secondary vehicles that is behind the primary vehicle; and
   outputting the contingency action to at least one system of the primary vehicle to drive the primary vehicle autonomously in accordance with the determined contingency action.

2. The method of claim 1, further comprising acquiring vehicle data by communicating directly with one or more of the one or more secondary vehicles.

3. The method of claim 1, further comprising acquiring vehicle data by communicating with a remote controller, wherein at least one secondary vehicle transmits data relating to its driving state to the remote controller, which forwards the data from each secondary vehicle to the primary vehicle.

4. The method of claim 1, further comprising acquiring vehicle data by communicating directly with each secondary vehicle that is in close proximity to the primary vehicle to obtain vehicle data from each secondary vehicle that is in close proximity to the primary vehicle, and communicating with a remote controller to obtain vehicle data from each secondary vehicle that is not in close proximity to the primary vehicle.

5. The method of claim 1, further comprising obtaining data from an on-board sensor of the primary vehicle to supplement the vehicle data from each secondary vehicle.

6. The method of claim 1, wherein the vehicle data from each secondary vehicle further includes at least one of the following: position; velocity; acceleration; braking state; location; driving mode; and terrain type.

7. The method of claim 1, further comprising issuing the request to switch to the manual mode through a driver information system of the primary vehicle.

8. The method of claim 1, further comprising determining failure of the driver to accept the request to switch the primary vehicle to the manual mode within a predetermined time period.

9. The method of claim 1, further comprising determining failure of the driver to accept the request to switch the primary vehicle to the manual mode from a lack of driver input to one or more vehicle systems within a predetermined time period.

10. The method of claim 9, wherein the vehicle systems comprise at least one of the following: a steering system; and a braking system.

11. The method of claim 1, further comprising acquiring the vehicle data from each secondary vehicle at the primary vehicle and determining the contingency action at the primary vehicle.

12. The method of claim 1, further comprising:
   transmitting the primary vehicle driving state and a signal from the primary vehicle to a remote controller, the signal indicating failure of the driver to accept the request to switch the primary vehicle to the manual mode;
   acquiring the vehicle data from each secondary vehicle at the remote controller;
   determining, at the remote controller, the contingency action to take with the primary vehicle based on the primary vehicle driving state and the vehicle data from each secondary vehicle; and
   outputting the contingency action from the remote controller to the automated driving system of the primary vehicle.

13. A vehicle controller for driving a primary vehicle autonomously when the primary vehicle is in an autonomous mode, the primary vehicle also being operable manually by a driver when in a manual mode, the vehicle controller comprising:
   an output of the vehicle controller configured to issue, when the primary vehicle is in the autonomous mode, a request to switch the primary vehicle to the manual mode;
   an input of the vehicle controller arranged to receive vehicle data from one or more surrounding secondary vehicles, wherein the vehicle data comprises parameters defining a driving state for each secondary vehicle indicative of at least one of an indicator state and planned actions;
   a processor of the vehicle controller configured to determine failure of the driver to accept the request to switch the primary vehicle to the manual mode, to determine a primary vehicle driving state comprising a position and a velocity of the primary vehicle, to make an assessment of the driving state for each respective secondary vehicle, and to determine a contingency action to take with the primary vehicle based on the position and the velocity of the primary vehicle and the indicator state and/or planned actions of one or more surrounding secondary vehicles received at the input, wherein the determined contingency action is based on the indicator state and/or planned actions of at least one of the one or more surrounding secondary vehicles that is behind the primary vehicle; and
   a control module of the vehicle controller configured to issue control commands to drive the primary vehicle autonomously in accordance with the determined contingency action.

14. A remote controller for communicating with a primary vehicle when the primary vehicle is in an autonomous mode, the primary vehicle also being operable manually by a driver when in a manual mode, the remote controller comprising:

an input of the remote controller arranged to: receive data from the primary vehicle and data from one or more secondary vehicles surrounding the primary vehicle, wherein the data received from the primary vehicle and the one or more secondary vehicles surrounding the primary vehicle comprises: a signal indicating failure of the driver to accept a request to switch the primary vehicle to the manual mode; and parameters defining a driving state for each secondary vehicle indicative of at least one of an indicator state and planned actions;

a processor of the remote controller configured to: determine a primary vehicle driving state comprising a position and a velocity of the primary vehicle; make an assessment of the driving state for each respective secondary vehicle; and determine a contingency action to take with the primary vehicle based on the position and the velocity of the primary vehicle and the indicator state and/or planned actions of each secondary vehicle, wherein the determined contingency action is based on the indicator state and/or planned actions of at least one of the one or more secondary vehicles that is behind the primary vehicle; and an output of the remote controller configured to transmit the contingency action to at least one system of the primary vehicle to enable the primary vehicle to drive autonomously in accordance with the determined contingency action.

* * * * *